United States Patent

Watson

(10) Patent No.: US 8,357,251 B2
(45) Date of Patent: Jan. 22, 2013

(54) POWDER PROCESSING METHOD

(75) Inventor: Thomas J. Watson, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 79 days.

(21) Appl. No.: 12/847,427

(22) Filed: Jul. 30, 2010

(65) Prior Publication Data

US 2012/0024110 A1 Feb. 2, 2012

(51) Int. Cl.
*B22F 1/00* (2006.01)
*B22F 9/02* (2006.01)

(52) U.S. Cl. .................. 148/513; 75/343; 75/363

(58) Field of Classification Search .......... None
See application file for complete search history.

(56) References Cited

U.S. PATENT DOCUMENTS

| | | | |
|---|---|---|---|
| 1,852,583 A | 4/1932 | Lucas | |
| 4,388,088 A * | 6/1983 | Rozmus et al. | 266/250 |
| 4,432,813 A * | 2/1984 | Williams | 148/514 |
| 5,039,476 A * | 8/1991 | Adachi et al. | 419/13 |
| 5,383,615 A | 1/1995 | Calka | |
| 5,958,156 A * | 9/1999 | Kemp | 148/513 |
| 6,902,845 B2 * | 6/2005 | Tani et al. | 429/218.2 |
| 2011/0189497 A1 * | 8/2011 | Kubota et al. | 428/577 |

FOREIGN PATENT DOCUMENTS

| | | |
|---|---|---|
| CN | 1537690 | 10/2004 |
| JP | 2000258064 | 9/2000 |

OTHER PUBLICATIONS

EP Search Report dated May 10, 2012.

* cited by examiner

*Primary Examiner* — George Wyszomierski
(74) *Attorney, Agent, or Firm* — Carlson, Gaskey & Olds PC

(57) ABSTRACT

A powder processing method includes degassing a metallic powder in a rotating chamber that is evacuated to a sub-atmospheric pressure. The method may also include storing the metallic powder in a rotating storage chamber that is pressurized to a super-atmospheric pressure with a dry cover gas.

23 Claims, 2 Drawing Sheets

POWDER PROCESSING METHOD

STATEMENT REGARDING FEDERALLY SPONSORED RESEARCH

This invention was made with government support under Contract No. HR0011-06-3-0003 awarded by the United States Department of Defense Advanced Research Projects Agencies. The Government has certain rights in this invention.

BACKGROUND

This disclosure relates to handling of metallic powders that are sensitive to picking up moisture during processing.

Metallic powders, such as aluminum-based alloys, may be formed by injecting molten alloy into a high pressure inert gas stream to atomize the alloy. In subsequent handling, the powder may be exposed to air from the ambient surrounding environment and may pick up moisture from the air. The moisture does not have a significant influence on typical end uses of the powder, such as paint pigment, and in many cases remains in the powder. If desired, the moisture may be "scrubbed" from the powder at an elevated temperature. Some powder may also be used in a downstream, high temperature processing step, such as in liquid phase sintering, which removes the moisture in the course of powder consolidation.

SUMMARY

A disclosed powder processing method includes degassing a metallic powder in a rotating chamber that is evacuated to a sub-atmospheric pressure. Alternatively, or in addition to the degassing, the method may include storing the metallic powder in a rotating storage chamber that is pressurized to a super-atmospheric pressure with a dry cover gas.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
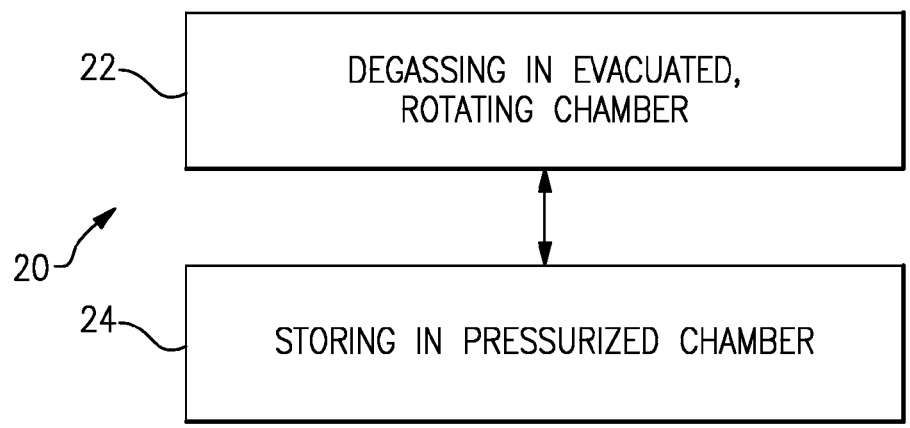
FIG. 1 illustrates an example method for powder processing.

FIG. 1 illustrates selected portions of an example powder processing method 20 for treating metallic powders that are sensitive to moisture and/or heat. As an example, glassy aluminum-based powders that include transition metals and/or rare earth metals readily form oxides, which may absorb and adsorb moisture from the surrounding environment. The hydrogen contained in the moisture may be chemisorbed and/or physisorbed onto the metallic powder. The presence of hydrogen and an application of heat to remove the hydrogen can be detrimental to the microstructure, and therefore the properties, of the end use component that is formed from the powder. Additionally, controlled-microstructure metallic powders, such as powders containing nanophases or desirable crystal structures, may be sensitive to heat. As will be described, the disclosed method 20 may be used to prevent or limit absorption and adsorption of moisture in the powder and/or limit the exposure of the powder to heat. As a comparison, the purpose of some powder processing techniques may be to clean a powder that is already contaminated with moisture from exposure of the powder to air, rather than handle the powder in a manner that prevents or limits absorption and adsorption of moisture as in this disclosure.

As an example based on glassy aluminum-based powders, the powder may chemisorb and/or physisorb moisture. One type of chemisorbed moisture is hydrogen within the bulk of the powder. The hydrogen is present in solid solution, but tends to migrate to "traps," such as grain boundaries, second phase interfaces, dislocations, etc. These locations are energetically favorable sites for the hydrogen, where the hydrogen will remain at temperatures approaching the melting point of the powder.

A second form of chemisorbed moisture is found within the oxide on a powder particle. For aluminum, the hydrogen is in the form of alumina monohydrate ($Al_2O_3 \cdot H_2O$). At atmospheric pressure, alumina monohydrate is stable to 986° F. (approximately 530° C.) before decomposing to anhydrous alumina ($Al_2O_3$).

The two forms of physisorbed moisture include alumina trihydrate ($Al_2O_3 \cdot 3H_2O$), which is weakly bonded to the alumina surface, and moisture ($H_2O$) that physically envelops the alumina surface of a powder particle. The alumina trihydrate decomposes at approximately 700° F. (371° C.) at atmospheric pressure and the moisture ($H_2O$) evaporates at temperatures above 212° F. (100° C.).

Thus, for chemisorbed and physisorbed moisture that the powder may pick up, relatively high temperatures where nanocrystalline microstructures of the powder are unstable would be required to remove the hydrogen.

As shown, the method 20 includes a degassing step 22 and a storing step 24 for inert handling of a metallic powder with regard to moisture and heat exposure. It is to be understood that the method 20 may be regarded as including the degassing step 22, the storing step 24, or both. That is, the degassing step 22 and the storing step 24 may be used independently. However, in other examples, the degassing step 22 and the storing step 24 may be used together, or in combination with other powder processing steps.

The following examples illustrate inert powder processing from formation of the metallic powder through storage of the metallic powder. However, as described above, the degassing step 22 and the storing step 24 may be used independently or with other steps. The metallic powder may be atomized in a known manner at super-atmospheric pressure in an atomization chamber. A high pressure inert gas, such as argon or nitrogen, may be injected through molten alloy to produce the metallic powder. The metallic powder may be captured in catch tanks that are near the bottom of the atomization chamber and cyclone in the system. The atomization chamber may be maintained at a positive pressure that is greater than normal atmospheric pressure. The catch tanks may then be sealed using a valve on the tank to isolate the interior from the surrounding environment. Thus, the catch tanks must be capable of containing the metallic powder at the super-atmospheric pressure without significant leakage, to prevent contamination of the powder from the surrounding atmosphere.

Super-atmospheric pressure may be a pressure above 760 torr, or approximately 15 pounds per square inch. In some examples, the selected super-atmosphereic pressure may be approximately 20 pounds per square inch or greater.

The catch tanks may include one or more sensors to monitor the conditions of the interior of the tank. For instance, the sensors may monitor a dew point within the tank. The dew point may be maintained between about −35° F. (−37° C.) and −85° F. (−65° C.). In a further example, the dew point is less than −85° F. If the dew point exceeds −35° F., the metallic powder may be regarded as contaminated.

The powder from the catch tanks is then be classified, also at super-atmospheric pressure with a dew point of less than −85° F. Thus, between the atomization, catching, and classification, the metallic power is continuously under a positive pressure that is greater than normal atmospheric pressure. As an example, the classification may be conducted under an inert, dry cover gas, such as argon. The term "dry" may refer to a dew point of less than −85° F. The dry cover gas may be circulated through the classification equipment to maintain a positive pressure. The equipment may also be provided with one or more sensors for monitoring the conditions of the environment in the equipment, such as the dew point, temperature, etc. The classified powder may then be collected in another catch tank that is similar to the catch tank used for atomization.

The metallic powder is then transferred to equipment for conducting the degassing step 22. For instance, the equipment degasses the metallic powder using a rotating chamber that is evacuated to a sub-atmospheric pressure. The pressure within the rotating chamber may be $10 \times 10^{-3}$ torr to $5 \times 10^{-6}$ torr. The degassing step 22 may be conducted at an elevated temperature of approximately 300-800° F. (149-427° C.). In some examples, the temperature may be 350-600° F. (177-316° C.). Alternatively, several different temperatures may be used. The metallic powder may be degassed in a first phase at a first temperature of 300-600° F. (149-316° C.) followed by a second phase at a temperature of 600-800° F. (316-427° C.). Using several different temperatures facilitates producing a finer microstructure and, therefore, higher strength properties in devitrified derivatives for glassy aluminum-based powders. The degassing may be conducted for 1-100 hours, depending upon the temperatures employed and the alloy characteristics.

Optionally, the rotating chamber may include internal baffles that agitate the metallic powder during rotation. The agitation, or rolling action of the chamber and baffles, exposes interstices between the powder particles and frees any moisture or other gas specie that is trapped in the interstices. As a comparison, in static degassing where a powder is not agitated, the powder particles may trap desorbed species in the interstices and thereby lengthen the time for degassing. By conducting the degassing step 22 in a rotating chamber, the interstices are exposed such that any desorbed species are freed. Thus, the disclosed degassing step 22 facilitates reducing degassing times while simultaneously reducing the need for elevated temperatures.

After degassing, the storing step 24 facilitates storing the metallic powder in a way that limits or prevents moisture contamination from the surrounding environment. As an example, the storing step 24 may include storing the metallic powder in a pressurized, rotating chamber. The chamber may be the same chamber as is used for the degassing step 22 or may be a separate chamber that receives a metallic powder under a dry cover gas that limits or prevents exposure of the metallic powder to moisture. Using a super-atmospheric pressure facilitates limiting exposure of the metallic powder to ambient environmental air because the pressure differential between the ambient surrounding and the super-atmospheric pressure dry cover gas tends to drive the dry cover gas out from the storage chamber rather than allowing environmental air to flow into the chamber. The dry cover gas also creates a moisture concentration gradient between the powder and the dry cover gas that facilitates driving moisture from the powder.

The metallic powder may be stored under ambient temperatures of approximately 65-90° F. (18-32° C.). Similar to the degassing step 22, the chamber rotates during storage to agitate the metallic powder and facilitate freeing any moisture or gas specie that is present within the powder interstices. In this regard, the chamber used to store the metallic powder may also include baffles that agitate or roll the powder during storage.

The rotating chamber is pressurized with a dry cover gas, such as argon or nitrogen. The cover gas may be used for a predetermined amount of time or, alternatively, continuously circulated through the rotating chamber. In one example, the cover gas resides in the storage chamber for approximately 24 hours, or until saturated with moisture, after which time a gas supply system purges the moist cover gas from the rotating chamber and replenished the chamber with new dry cover gas. Replacing moist cover gas with new dry cover gas facilitates maintaining a moisture concentration gradient between the metallic powder and the cover gas to drive moisture from the powder.

Alternatively, the gas supply system may continuously circulate dry cover gas through the rotating chamber to maintain a continuous moisture concentration gradient between the powder and the cover gas that drives moisture from the powder. The chamber may be revolved at a rate of approximately 0.1-1 rpm. Additionally, the cover gas may be maintained at a dew point of less than −90° F. to maintain the moisture concentration gradient.

Figure 2:
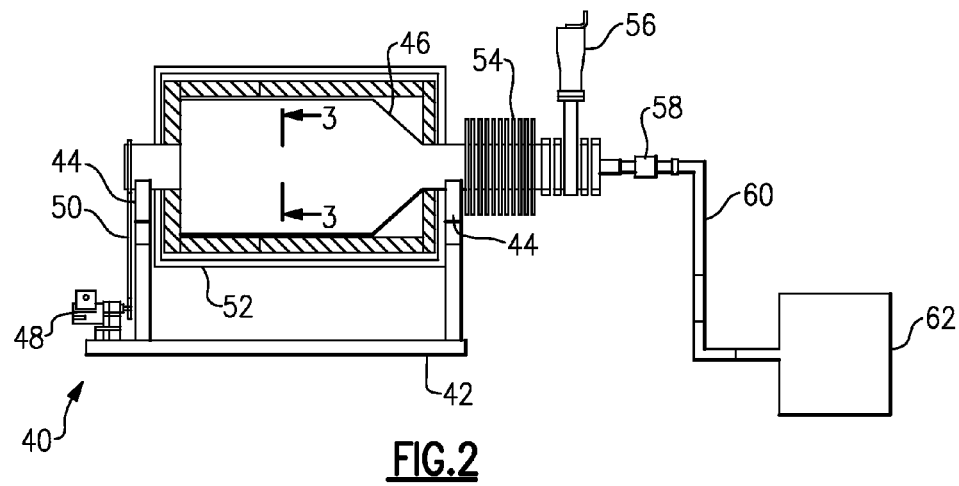
FIG. 2 illustrates an example degassing system.

FIG. 2 illustrates selected portions of an example degassing system 40 that may be used to conduct the degassing step 22 described above. In this example, the degassing system 40 includes a support 42 having support rollers 44 for rotationally supporting a degassing chamber 46. A motor 48 is linked to the degassing chamber 46 by a drive chain 50. The degassing chamber 46 is mounted on the support rollers 44 within a heated enclosure 52, such as a clam shell enclosure, such that when the motor 48 drives the drive chain 50, the degassing chamber 46 rotates on the support rollers 44 within the heated enclosure 52.

The end of the degassing chamber 46 is outfitted with cooling fins 54 and a valve 56, such as a gate valve. A rotary connection 58 connects the degassing chamber 46 with a tube 60 and a vacuum station 62. The vacuum station 62 may be a two-stage vacuum station having one or more roughing pumps and one or more diffusion pumps. The rotary connection 58 allows connection between the rotating degassing chamber 46 and the rotationally fixed tube 60. Thus, the motor 48 can rotate the degassing chamber 46 while the vacuum station 62 evacuates and maintains a vacuum within the degassing chamber 46.

The degassing chamber 46 may also include ball valves for any access points. Each ball valve may be rated for hard vacuum ($10^{-6}$ torr) and a pressure of 100 psi min and may have a diameter of 6 to 8 inches. The valves may also have locks in order to preclude accidental opening during shipment or use.

In use, the valve 56 selectively opens or closes access to the degassing chamber 46. The cooling fins 54 cool any gas that is purged from the degassing chamber 46, to protect downstream components from the elevated temperature of the gas.

Figure 3:
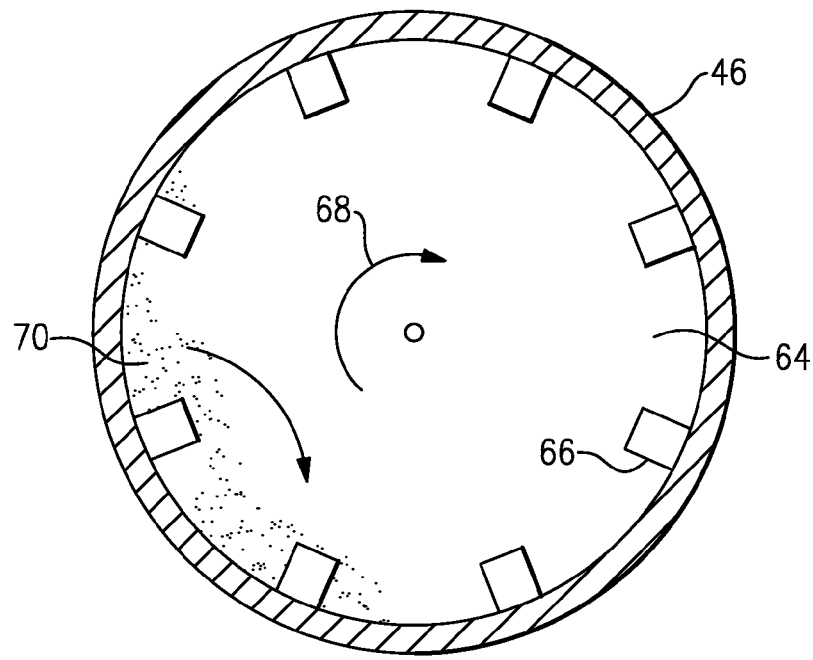
FIG. 3 illustrates an example degassing chamber.

FIG. 3 illustrates a cross-section of the degassing chamber 46. In the illustrated example, the degassing chamber 46 includes an internal volume 64 and baffles 66 that extend radially inward from the outer wall of the chamber 46. The baffles 66 may have a height of approximately 0.25-1 inches (0.64-2.54 centimeters). As illustrated, upon rotation of the degassing chamber 46 along direction identified at 68, metallic powder 70 within the chamber 46 tumbles over the baffles 66 to thereby expose the interstices of the powder particles.

Figure 4:
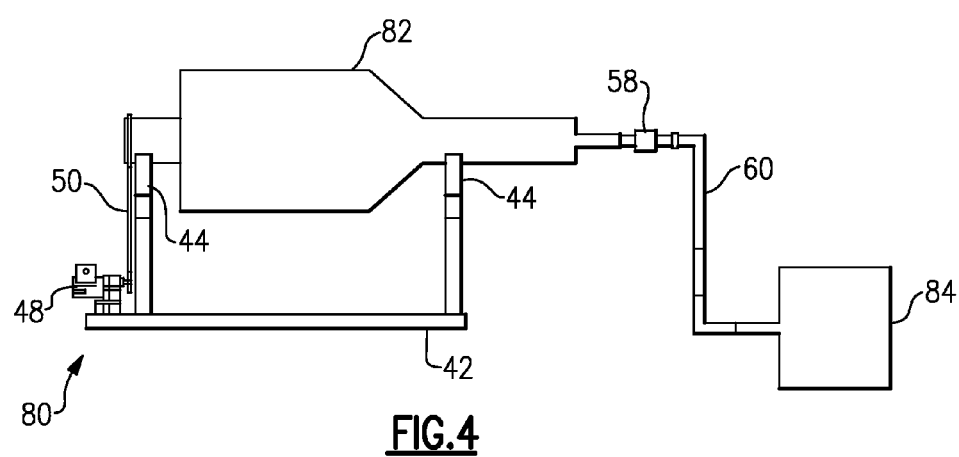
FIG. 4 illustrates an example storage system.

FIG. 4 illustrates selected portions of an example storage system 80 that may be used to conduct the storing step 24 of method 20. In this example, some of the components of the storage system 80 are the same as the components of the degassing system 40 and are therefore numbered accordingly. The storage system 80 includes a storage chamber 82 that is supported on the rollers 44 and connected to a pressurized gas system 84. The storage chamber 82 may be designed similar to the degassing chamber 46 with regard to the baffles 66 shown in FIG. 3.

The pressurized gas system 84 may include pressurized gas tanks, valves, sensors, controllers, and the like for controlling gas supply as desired. In one example, the gas is nitrogen ("GN2") of high purity and low moisture content. The GN2 may be obtained from a liquid nitrogen tank ("LN2"). The pressurized gas system 84 may monitor the dew point of the gas in the storage chamber 82 and the dew point of the GN2 supplied from the pressurized gas system 84. For instance, the dew point of the supplied gas may be $\leqq -90°$ F. The pressurized gas system 84 may optionally also include oxygen/moisture traps between the GN2 and the storage chamber 82 and a data logger/controller to sample dew point and oxygen levels of GN2. The pressurized gas system 84 may also establish a data link to monitor the LN2 level. The data link allows the GN2 to replenish LN2 on an as-required basis to maintain the desired pressure in the storage chamber 82.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A powder processing method comprising:
   degassing a metallic powder in a chamber that is evacuated to a sub-atmospheric pressure;
   agitating the chamber that is evacuated to a sub-atmospheric pressure; and
   after the degassing, storing the metallic powder in a storage chamber that is pressurized to a super-atmospheric pressure with a dry cover gas.

2. The powder processing method as recited in claim 1, wherein the degassing includes agitating the metallic powder using baffles within the rotating chamber.

3. The powder processing method as recited in claim 1, including conducting the degassing at a temperature of 300-800° F.

4. The powder processing method as recited in claim 1, including conducting the degassing at a temperature of 350-600° F.

5. The powder processing method as recited in claim 1, including conducting the degassing in a first phase at a first temperature followed by a second phase at a second, greater temperature.

6. The powder processing method as recited in claim 5, wherein the first temperature is 300-600° F. and the second temperature is 600-800° F.

7. The powder processing method as recited in claim 1, further comprising agitating the storage chamber.

8. The powder processing method as recited in claim 1, further comprising rotating the storage chamber.

9. A powder processing method comprising:
   degassing a metallic powder in a rotating chamber that is evacuated to a sub-atmospheric pressure; and
   prior to the degassing, forming the metallic powder at super-atmospheric pressure and containing the metallic powder in a catch chamber at the super-atmospheric pressure.

10. The powder processing method as recited in claim 9, including maintaining the catch chamber at a dew point less than −85° F.

11. The powder processing method as recited in claim 9, including monitoring a dew point in the catch chamber.

12. The powder processing method as recited in claim 9, further comprising, after the forming, classifying the metallic powder under super-atmospheric pressure with a dew point of less than −85° F.

13. A powder processing method comprising:
   storing a metallic powder in a rotating chamber that is pressurized to a super-atmospheric pressure with a dry cover gas; and
   purging moist cover gas from the rotating chamber after a predetermined amount of time and replenishing the rotating chamber with new dry cover gas.

14. The powder processing method as recited in claim 13, wherein the storing includes agitating the metallic powder using baffles within the rotating chamber.

15. The powder processing method as recited in claim 13, including conducting the storing under a temperature of 65-90° F.

16. The powder processing method as recited in claim 13, further comprising establishing a continuous flow of the dry cover gas through the rotating chamber.

17. The powder processing method as recited in claim 16, further comprising maintaining a continuous moisture concentration gradient between the metallic powder and the dry cover gas.

18. The powder processing method as recited in claim 13, including revolving the rotating chamber at a rate of approximately 0.1-1 revolutions per minute.

19. The powder processing method as recited in claim 13, including establishing a dew point of less than −90° F. within the rotating chamber.

20. The powder processing method as recited in claim 13, including pressurizing the chamber using a pressurized gas system having a pressurized gas tank.

21. The powder processing method as recited in claim 13, including monitoring a dew point in the chamber.

22. A powder processing method comprising:
   degassing a metallic powder in a rotating chamber that is evacuated to a sub-atmospheric pressure; and
   after the degassing, storing the metallic powder in a rotating storage chamber that is pressurized to a super-atmospheric pressure with a dry cover gas.

23. A powder processing method comprising:

storing a metallic powder in a rotating chamber that is pressurized to a super-atmospheric pressure with a dry cover gas;

purging moist cover gas from the rotating chamber after a predetermined amount of time and replenishing the rotating chamber with new dry cover gas; and monitoring a level of the dry cover gas in the chamber and, in response to the level, replenishing the dry cover gas in the chamber to maintain a desired pressure.

* * * * *